United States Patent

[11] 3,586,753

| | | |
|---|---|---|
| [72] | Inventor | John A. Smith<br>Rochester, N.H. |
| [21] | Appl. No. | 859,321 |
| [22] | Filed | Sept. 19, 1969 |
| [45] | Patented | June 22, 1971 |
| [73] | Assignee | General Electric Company |

[54] SECONDARY TERMINAL CONDUIT BOX FOR CURRENT TRANSFORMERS
5 Claims, 3 Drawing Figs.

[52] U.S. Cl. .................................................. 174/50, 174/138 F
[51] Int. Cl. .................................................. H02g 3/08
[50] Field of Search .................................................. 174/138.4, 5, 48, 49; 310/71, 75, 89, 88; 339/36, 116, 114; 336/107

[56] References Cited
UNITED STATES PATENTS

| | | | |
|---|---|---|---|
| 2,038,353 | 4/1936 | Gardner | 310/71 |
| 2,283,733 | 5/1942 | Hartzell et al. | 336/107 X |
| 2,590,559 | 3/1952 | Miller | 174/138.4 UX |
| 3,150,230 | 9/1964 | Goodman | 174/59 |
| 3,395,243 | 7/1968 | Kelly | 174/48 |
| 3,408,094 | 10/1968 | Flachbarth | 174/48 X |
| 3,457,360 | 7/1969 | D'Entremont | 174/5 X |

Primary Examiner—Lewis H. Myers
Assistant Examiner—D. A. Tone
Attorneys—Francis X. Doyle, Frank L. Neuhauser, Oscar B. Waddell and Joseph B. Forman ABSTRACT: A conduit box for mounting over the secondary terminals of a current transformer. An insulated retainer member is provided which fits over the secondary terminals and is secured thereto by use of E-rings, fitting in grooves in such secondary terminals. The conduit box has ledges on the inside walls which cooperate with notched portions of the retainer member to hold the conduit box securely in place over the secondary terminals.

PATENTED JUN 22 1971 3,586,753
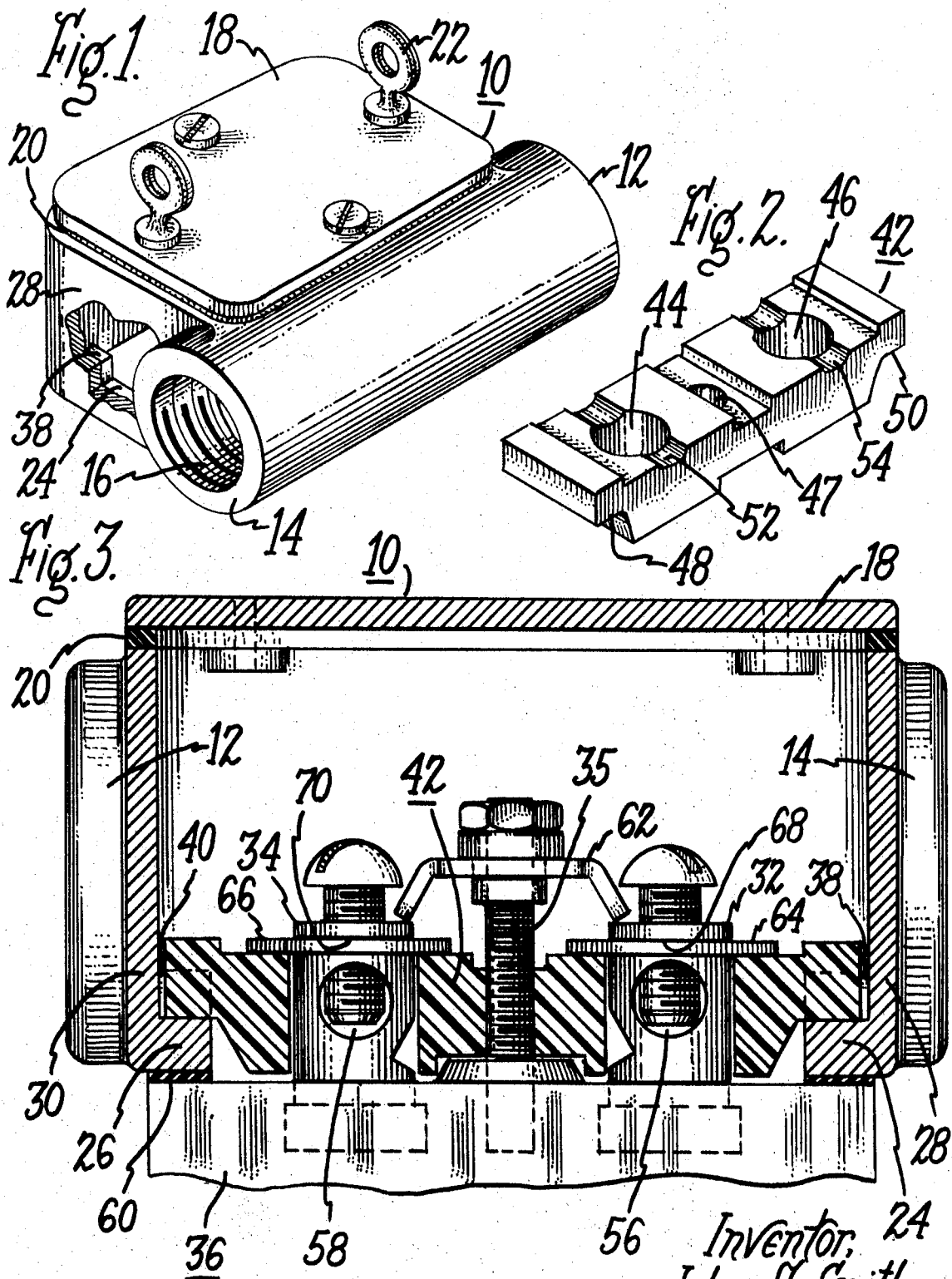
Inventor,
John A. Smith
by Francis X. Doyle
His Attorney.

SECONDARY TERMINAL CONDUIT BOX FOR CURRENT TRANSFORMERS

BACKGROUND OF THE INVENTION

This invention relates to instrument transformers and more particularly to an auxiliary conduit box for the secondary terminals of a secondary transformer.

In many current transformers the users desire a conduit box attached to the transformer which enclose the secondary terminals and provide for the connection of conduit or pipe to the box. As is well understood, these conduits or pipes carry secondary leads from the metering devices, relays or the like to the secondary terminals of the current transformer. However, in many instances, conduit boxes are not desired or they cannot be used. Sometimes, due to the installation requirements, space factors, and the like, conduit boxes cannot be used. In other instances, where the installation does not utilize conduits or pipes, it is not desirable to have conduit boxes covering the secondary terminals. Thus, it is not considered desirable to manufacture all types of current transformers with conduit boxes, since in some instances they can not be used and in other instances, they are not desired by the user. However, it is considered desirable to provide means in conjunction with current transformers which will allow a conduit box to be added later as an auxiliary or accessory unit, where it is desired. Many devices are presently available by which conduit boxes may be attached to the transformer. For example, in some instances, threaded inserts are provided in the body of the transformer to allow a conduit box to be attached thereto. In other instances, hoops or clamps are provided which will surround the transformer body and will hold a conduit box firmly about the secondary terminals. In other instances, conduit boxes are provided with straps for attachment directly to the secondary terminals.

The use of threaded inserts tends to add an incremental expense to each transformer and thus a user must pay such incremental expense even where no conduit box will subsequently be used. The hoop or clamp type conduit boxes are usually considered undesirable since they often interfere with identification markings on the transformer or connection plates which are used at the base of the transformer. The presently available boxes which are secured to the secondary terminals do not provide the desired strength or sealing which is considered necessary in outdoor-type transformers and further many do not present a pleasing appearance when connected to the transformer.

Thus, there is presently a need in the instrument transformer field for an auxiliary or accessory conduit box which may be readily attached to a current transformer when desired, which does not require threaded inserts, hoops and the like. There is also a need for a conduit box which may be readily attached to the secondary terminals of a transformer, providing a strong secure attachment and a generally pleasing appearance.

It is, therefore, one object of this invention to provide a novel auxiliary conduit box for current transformers.

A further object of this invention is to provide an auxiliary conduit box which can be readily attached to the secondary terminals of a current transformer without the use of external hoops and the like and without the need for threaded inserts or other members in the body of the transformer.

A still further object of this invention is to provide a novel auxiliary conduit box for current transformers which has a pleasing appearance.

SUMMARY OF THE INVENTION

In one preferred form of this invention a conduit box is provided for mounting over the secondary terminals of a current transformer. Ledges are provided on two opposite inside walls of the conduit box. An insulating retaining member having mating notched portions and with openings to receive the secondary terminals is also provided. Clamping means are used to secure the retainer member to the secondary terminals. The mating notches of the retainer cooperate with the ledges of the conduit box to hold it firmly in place on the transformer over the secondary terminals.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment thereof particularly when considered in the light of the accompanying drawing.

BRIEF DESCRIPTION OF DRAWING

FIG. 1 is a perspective view, with a portion broken away, of a preferred form of an auxiliary conduit box for attachment to an instrument transformer, according to this invention;

FIG. 2 is a perspective view of a preferred form of retainer member according to this invention; and FIG. 3 is a sectional plan view showing the conduit box of FIG. 1 secured to the secondary terminals of a current transformer by the retainer of FIG. 2 in accordance with the preferred embodiment of this invention.

DESCRIPTION OF PREFERRED EMBODIMENT

Referring now to the drawing in which like numerals are used to indicate like parts throughout and with particular reference to FIG. 1 there is shown a perspective view of a preferred form of an accessory conduit box 10, according to the invention. The conduit box 10 has an open bottom as can be clearly seen in FIG. 3 and is provided with a pair of hub members 12 and 14 threaded as at 16 for the reception of conduit or pipe in a well-known manner. Threaded plugs (not shown) may be inserted in the hubs 12 and 14 in order to seal them, as desired. A removable cover 18 with a gasket 20 are provided to allow access to the interior of conduit box 10 and to seal the conduit box 10 when in use on an instrument transformer. Thumbscrews 22 are provided to allow easy removal and replacement of the cover 18. Conduit box 10 has a pair of inside ledges 24 and 26 (see FIG. 3) at the base of the walls 28 and 30, such ledges being used to secure the conduit box to the instrument transformer by means of the secondary terminals 32 and 34. In FIG. 3, a portion of the current transformer is shown at 36. A pair of raised bosses 38, 38 are provided on ledge 24 and a pair of raised bosses 38, 38 are provided on ledge 24 and a pair of bosses 40, 40 (only one shown) are provided on ledge 26 to hold the conduit box 10 firmly on transformer 36 as will presently appear.

A conduit box retainer 42 (see FIG. 2) made of an insulating material, such as fiber or plastic, has a pair of openings 44 and 46 which will receive the secondary terminals 32 and 34. An opening 47 is also provided between openings 44 and 46 for receiving a stud member 35 (FIG. 3) which may be mounted on the current transformer 36. The retainer 42 is preferably rectangular in shape, as is shown in FIG. 2, having a length substantially the same as the inside length as the conduit box 10, as appears in FIG. 3. The width of retainer 42 is such as to fit between the raised bosses 38, 38 on ledge 24 and the bosses 38,38 on ledge 24 and the bosses 40,40 on ledge 26. The ends of retainer 42 are notched, as shown at 48 and 50, to receive the ledges 24 and 26 as is clearly seen in FIG. 3. Channels 52 and 54 are preferably provided in retainer 42 intersecting the openings 44 and 46 respectively to allow easy access of secondary leads (not shown) to the openings 56, 58 in the secondary terminals 32 and 34.

FIG. 3 shows the conduit box 10 secured to terminals 32, 34 by retainer 42 in accordance with the preferred embodiment of the invention. In securing box 10 to transformer 36 the cover 18 is first removed. A gasket 60 is placed on the surface of transformer 36 about the secondary terminals 32, 34. The conduit box 10 is then placed on the gasket 60 and substantially centered about the secondary terminals 32, 34. If a shorting member 62 is provided, this is first removed. The retainer 42 is then placed inside box 10 and over the terminals 32, 34 and, if provided, over the stud 35, as is shown. The notches 48 and 50 are placed in contact with the ledges 24 and 26 between the bosses 38, 38 and 40, 40 respectively. Spring clamp members, such as E-rings 64, 66, are then placed in the grooves 68 and 70 of the terminals 32, 34 to hold retainer 42 on the terminals 32, 34 and in firm contact with ledges 24, 26 of the conduit box 10. As will be understood, the conduit box 10 is thus firmly secured to the transformer 36 about the secondary terminals 32, 34 and allows ready access thereto through the hub members 12 and 14.

While there has been shown and described the present preferred embodiment of this invention, it will of course be clear to those skilled in the art that various constructional changes may be made without departing from the spirit and scope of this invention.

What I claim as new and desire to secure by Letters Patent of the United States is:

1. An auxiliary conduit box for a current transformer comprising, in combination;
   a. An open bottom box member having a removable cover,
      1. a pair of threaded hubs on said box,
      2. a pair of ledges on the inside bottom edge of opposite walls of said box,
   B. A rectangular-shaped retainer member of electrically insulating material,
      1. said retainer having a pair of openings adapted to fit over the secondary terminals of a current transformer,
      2. A notched portion at each end of said retainer fitting onto said pair of ledges of said box,
   C. and spring clamping means connectable to the secondary terminals on said retainer and for clamping said retainer to the secondary terminals.

2. An auxiliary conduit box as claimed in claim 1, in which said box has a pair of upstanding bosses on each of said pair of ledges and said retainer is of a width to fit between each said pair of bosses.

3. An auxiliary conduit box as claimed in claim 1, in which said retainer has a pair of channels on the surface thereof, each of said channels intersecting one of said pair of openings.

4. An auxiliary conduit box as claimed in claim 1 in which said spring clamping members are E-rings.

5. An auxiliary conduit box as claimed in claim 1 in which said pair of ledges are adjacent said pair of threaded hubs.